United States Patent
Hanna

[15] 3,689,526
[45] Sept. 5, 1972

[54] PREPARATION OF ESTERS OF TETRACHLOROTEREPHTHALIC ACID

[72] Inventor: Delbert L. Hanna, Oak Park, Ill.

[73] Assignee: Melsical Chemical Corporation, Chicago, Ill.

[22] Filed: Feb. 20, 1970

[21] Appl. No.: 13,176

Related U.S. Application Data

[63] Continuation of Ser. No. 477,923, Aug. 6, 1965, abandoned.

[52] U.S. Cl..........260/475 R, 260/455 R, 260/471 R
[51] Int. Cl.............................................C07c 69/82
[58] Field of Search........................................260/475

[56] References Cited

UNITED STATES PATENTS

| | | | |
|---|---|---|---|
| 3,301,892 | 1/1967 | Rechter et al. | 260/521 |
| 3,160,654 | 12/1964 | Conly | 260/471 |
| 3,120,559 | 2/1964 | Hetzel | 260/475 |
| 2,975,209 | 3/1961 | Bos | 260/475 |

FOREIGN PATENTS OR APPLICATIONS

| 1,135,447 | 8/1962 | Germany | 260/475 |
|---|---|---|---|

OTHER PUBLICATIONS

Graebe, Ann., 340, pp. 244–249 (1905)
Erdos et al., Ca, 49, p. 6866 (1955)
Groggins Unit Processes in Org. Chem. pp. 285, 597, 601, 602 (1952)

*Primary Examiner*—Lorraine A. Weinberger
*Assistant Examiner*—Jane Skelly
*Attorney*—Robert J. Schwarz

[57] ABSTRACT

A process for the preparation of mono- and dialkyl esters of tetrachloroterephthalic acid which comprises reacting a lower alkyl sulfuric ester and tetrachloroterephthalic acid in a reaction medium having an acid strength greater than 100 percent sulfuric acid.

13 Claims, No Drawings

PREPARATION OF ESTERS OF TETRACHLOROTEREPHTHALIC ACID

This application is a continuation of my copending application Ser. No. 477,923, filed Aug. 6, 1965, now abandoned.

This invention relates to the esterification of tetrachloroterephthalic acid. In particular this invention relates to the preparation of mono- and di-lower alkyl esters of tetrachloroterephthalic acid in commercially advantageous yields.

Terephthalic acid and its chlorinated products are available in substantial quantities and present a useful building block in the construction of a variety of chemical products. One useful area is the variety of esters of tetrachloroterephthalic acid. Since tetrachloroterephthalic acid is a dicarboxylic compound, it is of particular advantage to be able to produce high yields of its monoester.

Difficulty is encountered in the direct esterification of tetrachloroterephthalic acid with alcohol. This difficulty is related to the presence of substituents in the position ortho to the carboxyl group. In the case of some acids, so hindered, particularly when the substituent is an alkyl group, this difficulty can be overcome by dissolving the carboxylic acid in 100 percent sulfuric acid and pouring this solution into an alcohol. This technique fails to produce significant amounts of ester when applied to tetrachloroterephthalic acid.

Several procedures have been proposed for the production of the monoesters of tetrachloroterephthalic acid with varying success and operating difficulties.

One such procedure is by the hydrolysis of the alkyl ester of tetrachloroterephthalic acid. This procedure is not a preferred method as the hydrolyzation requires more than mild conditions and is difficult to control to the extent required in hydrolyzation of only one of the ester groups. Furthermore, this reaction in certain instances will affect other substituents present in the ester. Accordingly, there are drawbacks in this procedure.

Another possibility for the production of monoesters of tetrachloroterephthalic acid is by reaction of the corresponding diacidchloride and alcohol. Essentially this process has the drawbacks present in the first described method of operation, and in addition the mixture of tetrachloroterephthaloyl chloride, methyl ester of tetrachloroterephthalic acid mono chloride and dimethyltetrachloroterephthalate produced by this procedure are very difficult to separate into the individual components.

It is therefore an object of the present invention to devise a process for the preparation of esters of tetrachloroterephthalic acid.

It is another object of the present invention to devise a process for the production of monoesters of tetrachloroterephthalic acid.

It is still another object of the present invention to devise a process for the production of diesters of tetrachloroterephthalic acid.

It is still another object of the present invention to perform the esterification of tetrachloroterephthalic acid without the formation of substantial quantities of other products that cannot be reused in the process.

Unexpectedly applicants have devised a novel process for the production of the mono- or di-lower alkyl esters of tetrachloroterephthalic acid. Lower alkyl in the present process means methyl and ethyl. The present process is particularly advantageous since by adjusting the ratio of reactants, the production of the desired mono- or di-ester can be controlled. This has commercial advantage since the dimethyl ester is useful in the control of crabgrass whereas the monomethyl and monoethyl esters of tetrachloroterephthalic acid are valuable chemical intermediates. As used herein the term "monoesters" refers to monomethyl tetrachloroterephthalate and monoethyl tetrachloroterephthalate whereas "diester" refers to dimethyl tetrachloroterephthalate and diethyl tetrachloroterephthalate.

In essence the present process comprises reacting tetrachloroterephthalic acid and a lower alkyl sulfuric ester in a reaction medium having an acid strength greater than 100 percent sulfuric acid. This acid strength can be obtained by introducing methyl sulfuric acid, ethyl sulfuric acid, chlorosulfonic acid, methylchlorosulfonate, dimethyl sulfonate, diethyl sulfate or sulfur trioxide into the reaction system in a molar amount greater than the sum of the moles of the tetrachloroterephthalic acid plus one-half of the moles of the methyl and ethyl sulfuric acid, if any. The sulfur trioxide can be introduced as fuming sulfuric acid. Dimethyl sulfate dissociates at temperatures of about 110° C and higher. Consequently when using dimethyl sulfate temperatures of 110° C and higher are used.

Exemplary of the lower alkyl sulfuric esters are methyl hydrogen sulfate (methyl sulfuric acid), dimethyl sulfate (methyl sulfate) and methyl chlorosulfonate, and the corresponding ethyl analogs. The lower alkyl sulfuric ester can be added directly to the reaction mixture or be formed in situ therein.

For example, it has been found that the desired reactions are not obtained when 100 percent sulfuric acid is used as the reaction medium. It has also been found necessary in order for the process to continue that the sulfur trioxide not be converted entirely to sulfuric acid during the reaction. This can readily be accomplished by maintaining a ratio of sulfur trioxide to water higher than about 1:1. At lower ratios the desired esterification reaction cannot proceed. Accordingly, one procedure for curtailing the reaction is to lower this ratio to its inoperable point wherein the esterification reaction will cease. This is of particular value in the preparation of the monoester.

As noted above one of the reactants is an esterifying agent consisting of an alkyl sulfuric ester which can be added as such or can be formed in the reaction medium in situ. The in situ formation of the esterifying agent is performed while maintaining the acid strength of the reaction medium at greater than 100 percent sulfuric acid. The auxiliary esterifying agent must be a compound that will release a methyl or ethyl radical in the highly acidic reaction medium. Among the auxiliary esterification agents for in situ formation of the alkyl sulfuric esterifying agents are methyl bromide, methanol, methyl acetate, dimethyl ether, ethyl bromide, ethanol, ethyl acetate and diethyl ether.

When it is desired to prepare maximum amounts of the diester it is preferred to use a substantially water-free system. This can be easily done by using sulfur trioxide or chlorosulfonic acid as the reaction medium and dimethyl sulfate or dimethyl ether as the esterification agent. The formation of diester in these media is highly favored when the molar ratio of esterification reagent to tetrachloroterephthalic acid exceeds about 2:1. At ratios higher than about 4:1, nearly quantitative yields of the diester are obtained. Inasmuch as water is released in the esterification reaction, the preferred molar ratio of sulfur trioxide to tetrachloroterephthalic acid is at least about 8:1 to afford a high molar ratio of sulfur trioxide to water at the end of the reaction.

When it is desirable to prepare maximum amounts of mono-ester in a substantially water free system, it is preferred to control the ratio of esterifying agent and tetrachloroterephthalic acid to between about 0.5:1 and 1.5:1. It can be desirable for economic reasons to operate using a system in which the molar ratio of sulfur trioxide to water is between about 2:1 and 3:1, in which case the preferred molar ratio of esterifying agent to tetrachloroterephthalic acid is between about 3:1 and 5:1. In both of these systems the preferred molar ratio of sulfur trioxide to tetrachloroterephthalic acid is between about 4:1 to 8:1.

It can be preferred for economic reasons to operate using a system in which a substantial portion of the sulfur trioxide is in the form of chlorosulfonic acid in which case the chlorosulfonic acid can be introduced or be formed in situ from sulfur trioxide by the introduction of hydrochloric acid. Use of chlorosulfonic acid in a molar ratio of at least about 4:1 based on the tetrachloroterephthalic acid can be preferred.

It has been found that the present process is operable at temperatures up to the temperature at which the tetrachloroterephthalic acid undergoes decarboxylation. Some esterification reaction will be obtained at room temperature. Elevated temperatures will have the effect of lowering the reaction time and increasing yields. For most purposes temperatures of about 50° C. and higher are appropriate. Temperatures between 50° C. and 150° C. are satisfactory, higher temperatures being usable.

It should be noted that when using dimethyl sulfate as the esterification agent it is best to use temperatures of the higher portion of this range or even higher in order to obtain the requisite dissociation of the dimethyl sulfate into sulfur trioxide.

One of the features of this process is the absence in the product of undesirable by-products. The only significant by-product is the presence of the diester in the desired monoester product. Since the esterification process is a reversible process, this diester can be recycled preventing any material loss of yield. Naturally it is preferable to minimize the diester in the desired monoester product but its presence is not of serious consequence.

Superatmospheric pressure can be used in operating the process with certain advantages, but the use of atmospheric pressure is sufficient. Superatmospheric pressure can shorten the reaction time by allowing higher operating temperatures. Normally it takes from one to four hours to obtain economic yields, varying with the precise reaction conditions and the identity of the desired product.

The following examples illustrate the operation of the present process.

EXAMPLE 1

A solution (450 grams) containing sulfur trioxide (76.5 grams; 0.96 mol), sulfuric acid (103.5 grams; 1.06 mols), chlorosulfonic acid (162 grams; 1.39 mole) and tetrachloroterephthalic acid (108 grams; 0.36 mol) was placed in a three-necked round bottom glass reaction flask equipped with thermometer, stirrer, heating mantle, and reflux condenser. The reaction mixture was heated to a temperature of 60° C. and methanol (40 grams; 1.25 mols) was added over a 2 hour reaction time with continuous stirring. The reaction mixture was quenched in water (500 cc) and filtered and washed with water. The dried product (85.5 grams) was analyzed by gas chromatography.

EXAMPLE 2

The procedure of Example 1 was repeated except for the use of a reaction time of 5 hours. The product weighed 86.0 grams and was analyzed by gas chromatography.

EXAMPLE 3

The procedure of Example 1 was repeated except for the use of a reaction temperature of 100° C. and a reaction time of 90 minutes. The product weighed 80.5 grams and was analyzed by gas chromatography.

EXAMPLE 4

The procedure of Example 1 was repeated except for the use of a reaction temperature of 140° C. and a reaction time of 2 ½ hours. The product weighed 86.5 grams and was analyzed by gas chromatography.

EXAMPLE 5

A solution (450 grams) containing sulfur trioxide (76.5 grams; 0.96 mol), sulfuric acid (103.5 grams; 1.06 mols), chlorosulfonic acid (162 grams; 1.39 mols) and tetrachloroterephthalic acid (108 grams, 0.36 mol) was placed in a three-neck round bottom glass reaction flask equipped with thermometer, stirrer, heating mantle and reflux condenser. The reaction mixture was heated to a temperature of 60° C. and methanol added according to the following schedule: 40 grams (1.25 mols) over a 3.5 hour reaction time; 40 grams (1.25 mols) over a 1.08 hour reaction time; 40 grams (1.25 mols) over a 0.4 hour reaction time; 40 grams (1.25 mols) over a 0.6 hour reaction time; 40 grams (1.25 mols) over a 0.25 hour reaction time and finally 800 grams (25 mols) over a 10-minute reaction time, with continuous stirring throughout the reaction. The reaction mixture was quenched in water (500 cc), methanol was allowed to evaporate, and the product was filtered off and washed with water. The dried product weighed 78.5 grams and was analyzed by gas chromatography.

EXAMPLE 6

The procedure of Example 1 was repeated except for the use of a reaction time of 1 hour, a reaction temperature of 100° C. and a reduction in the amount of methanol (4.0 grams; 0.12 mol). The product weighed 79.5 grams and was analyzed by gas chromatography.

EXAMPLE 7

The procedure of Example 1 was repeated except for the use of a reaction temperature of 100° C. and the use of methyl acetate (80 grams; 1.33 mol) as a replacement for the methanol used in Example 1. The product weighed 82.5 grams and was analyzed by gas chromatography.

EXAMPLE 8

The procedure of Example 1 was followed except for the use of a reaction temperature of 100° C. and the use of dimethyl ether (54 grams; 1.17 mols) as a replacement for the methanol used in Example 1. The product weighed 99.0 grams and was analyzed by gas chromatography.

EXAMPLE 9

The procedure of Example 1 was followed except for the use of a reaction temperature of 20°–75° C., a reaction time of 3 hours and the use of methyl bromide (115 grams; 1.18 mols) as a replacement for the methanol. The dried product weighed 89.0 grams and was analyzed by gas chromatography.

EXAMPLE 10

A solution (450 grams) containing sulfur trioxide (76.5 grams; 0.96 mols) sulfuric acid (103.5 grams; 1.06 mol) chlorosulfonic acid (162 grams; 1.39 mol) and tetrachloroterephthalic acid (108 grams; 0.36 mol) was placed in a three-necked round bottom glass reaction flask equipped with thermometer, stirrer, heating mantle and reflux condenser. Additional tetrachloroterephthalic acid (50 grams; 0.16 mol) and dimethyl tetrachloroterephthalate (50 grams; 0.15 mol.) were added to the flask. The reaction mixture was heated to a temperature of 120° C. and methanol (40 grams; 1.25 mol) was added over a 2 ½ hour reaction time with continuous stirring. After being quenched in water (500 cc), the reaction mixture was filtered, and washed with water. The dried product weighed 186.5 grams and was analyzed by gas chromatography.

EXAMPLE 11

A solution (450 grams) containing sulfur trioxide (76.5 grams; 0.96 mol), sulfuric acid (103.5 grams; 1.06 mol), chlorosulfonic acid (162 grams; 1.39 mol) and tetrachloroterephthalic acid (108 grams; 0.36 mol) was placed in a three-necked round bottom glass reaction flask equipped with thermometer, stirrer, heating mantle and reflux condenser. Additional tetrachloroterephthalic acid (100 grams; 0.33 mol) was added to the flask. The reaction mixture was heated to a temperature of 120° C and maintained at a temperature between 120° C and 155° C while methanol (40 grams; 1.25 mol) was added over a 40 minute reaction time with continuous stirring. After being quenched in water the reaction mixture was filtered and washed with water. The dried product weighed 170 grams and was analyzed by gas chromatography.

EXAMPLE 12

The procedure of Example 1 was followed except for the use of a reaction temperature of 100° C, a reaction time of 75 minutes and the use of dimethyl sulfate (102 grams; 0.81 mol) as a replacement for the methanol used in Example 1. The dried product weighed 92.0 grams and was analyzed by gas chromatography.

EXAMPLE 13

Tetrachloroterephthalic acid (80 grams; 0.26 mol) was added to a round bottom glass reaction flask equipped with thermometer, stirrer, heating mantle and reflux condenser and containing chlorosulfonic acid (324 grams; 2.8 mol). The mixture was heated to 80° C. to facilitate dissolving of the acid and then cooled to 60° C. Methanol (40 grams; 1.25 mol) was added over a reaction time of 4 hours and the reaction mixture was then quenched in water, filtered and washed with water. The dried product weighed 70 grams and was analyzed by gas chromatography.

EXAMPLE 14

Tetrachloroterephthalic acid (80 grams; 0.26 mol) was added to a round bottom glass reaction flask equipped with thermometer, stirrer, heating mantle and reflux condenser and containing 65 percent oleum (390 grams). The mixture was heated to 60° C and methanol (60 grams; 1.88 mol) was added over a 5 hour reaction time and the reaction mixture was then quenched in water, filtered and washed with water. The dried product weighed 65 grams and was analyzed by gas chromatography.

EXAMPLE 15

Tetrachloroterephthalic acid (80 grams; 0.26 mol) and dimethyl sulfate (268 grams; 2.1 mol) were placed in a round bottom glass reaction flask equipped with thermometer, stirrer, heating mantle and reflux condenser. The reaction mixture was heated and maintained at 100° C for one hour; then for an additional 1 ½ hours at 150° C and for a few minutes at 165° C. Analytical samples were taken at the end of the first hour and again after the subsequent 1 ½ hours. The reaction mixture was then quenched in water, filtered and washed with water. The dried product weighed 68 grams and was analyzed by gas chromatography.

EXAMPLE 16

Methanol (135 cc) was added to a round bottom glass reaction flask equipped with thermometer, stirrer, heating mantle and reflux condenser and containing chlorosulfonic acid (200 cc). Tetrachloroterephthalic acid (80 grams; 0.26 mol) was then added to the reaction mixture and the mixture was heated and maintained at 100° C for a 2 hour reaction time. The reaction mixture was then quenched in water, filtered and washed with water. The final product weighed 93 grams and was analyzed by gas chromatography.

EXAMPLE 17

Tetrachloroterephthalic acid (80 grams; 0.26 mol) and chlorosulfonic acid (200 cc) were placed in a round bottom glass reaction flask equipped with thermometer, stirrer, heating mantle and reflux condenser. Dimethyl ether (49 grams; 0.57 mol) was added and the mixture was heated to 100° C and maintained at that temperature for 1 hour. Then the reaction mixture was quenched in water, filtered and washed with water. The dried product weighed 94 grams.

Results of Examples 1-17

| Ex. No. | Wt % MMTA[1] | Wt % DMTA[2] | Wt % TA[3] |
|---|---|---|---|
| 1 | 48 | 23 | 29 |
| 2 | 48 | 28 | 24 |
| 3 | 59 | 27 | 14 |
| 4 | 51 | 17 | 33 |
| 5 | 48 | 27 | 25 |
| 6 | 8 | 0 | 92 |
| 7 | 38 | 21 | 41 |
| 8 | 33 | 60 | 7 |
| 9 | 54 | 24 | 22 |
| 10 | 41 | 23 | 34 |
| 11 | 35 | 14 | 51 |
| 12 | 49 | 21 | 30 |
| 13 | 52 | 14 | 34 |
| 14 | 25 | 17 | 58 |
| 15 | 4 | 96 | 0 |
| 16 | 19 | 81 | 0 |
| 17 | 32 | 65 | 3 |

[1] monomethyltetrachloroterephthalate
[2] dimethyltetrachloroterephthalate
[3] tetrachloroterephthalic acid

EXAMPLE 18

Tetrachloroterephthalic acid (80 grams, 0.26 mol) was added to chlorosulfonic acid (375 grams; 3.1 mol) in a round bottom glass reaction flask equipped with thermometer, stirrer, heating mantle and reflux condenser. The mixture was heated to 60° C and ethanol (40 grams; 0.87 mol) was added over a 3-hour reaction time and the reaction mixture was then quenched in water, filtered and washed with water. The dried product weighed 69.5 grams and was analyzed by gas chromatography. The product analyzed diethyl tetrachloroterephthalate (15 weight percent), monoethyl tetrachloroterephthalate (44 weight percent) and tetrachloroterephthalic acid (41 weight percent.)

In the foregoing examples tetrachloroterephthalic acid was used as a reactant. It is a part of this invention that the corresponding acid chloride can be used in this process. Use of the acid chloride often would require its preparation from the free acid and is not necessary to the successful performance of the present process.

Depending on the ultimate use for the products of this process, it can be desirable to isolate the monomethyl or monoethyl tetrachloroterephthalic acid from the diester and free acid starting material present in the product. In other instances the product can be used without further purification.

In those situations where it is desirable to have pure monomethyl or monoethyl tetrachloroterephthalate this can be accomplished by a variety of means of varying efficiency. One procedure is as follows:

The product containing monomethyl tetrachloroterephthalate, tetrachloroterephthalic acid, and dimethyl tetrachloroterephthalate is added to a solution of potassium hydroxide and filtered. This separates the dimethyl tetrachloroterephthalate. Hydrochloric acid is then added to the potassium hydroxide extract, precipitating the mixture of acids. Chloroform is then added in a quantity of from 50 to 100 cc per 10 grams of acids. The chloroform extract can then be filtered and evaporated to give the monomethyl tetrachloroterephthalate.

Other procedures for the isolation of the mono-esters can be employed as desired.

As previously indicated the monoesters are particularly valuable as chemical intermediates. The sterically hindered carboxylate group will undergo certain reactions. One principal use of it is to prepare the acid chloride, a highly reactive material capable of undergoing substantial reactions.

The acid chloride of monomethyl or monoethyl tetrachloroterephthalate can be prepared by dissolving the acid in a suitable solvent, such as benzene and adding excess thionyl chloride on a molar basis thereto. This reaction proceeds quantitatively. The following example illustrates its preparation:

EXAMPLE 19

Monomethyl tetrachloroterephthalate (10 grams; 0.031 mol) was placed in a 200 cc round bottom glass reaction flask equipped with heating mantle and reflux condenser. Thionyl chloride (33.8 grams; 0.285 mol) was added to the reaction flask. The temperature of the reaction mixture was raised to reflux and maintained at gentle reflux for 1 hour. The excess thionyl chloride was evaporated off leaving product (10.5 grams) containing monomethyl tetrachloroterephthaloyl chloride (63 weight percent).

This acid chloride can be reacted to prepare several useful compounds. Some of the reactions of the acid chloride of monomethyltetrachloroterephthalate and the products thereof are as follows:

EXAMPLE 20

Concentrated ammonium hydroxide (500 cc) is placed in a 1 liter round bottom glass reaction flask equipped with thermometer, stirrer, addition funnel, reflux condenser and cooling means. The acid chloride of monomethyl tetrachloroterephthalate (50 grams; 0.18 mol) is dissolved in dioxane (120 cc) and this solution is added to the reaction flask over a 15-minute period while maintaining rapid stirring and holding the reaction temperature at room temperature. After the addition of the acid chloride dioxane solution is complete, the reaction mixture is allowed to stand for 1 hour. The solids are filtered off, washed with water and dried. The amide of monomethyl tetrachloroterephthalate (40 grams) and having a melting point of 203°–205° C is obtained.

EXAMPLE 21

The acid chloride of monomethyl tetrachloroterephthalate (336.5 grams; 0.9 mole) and benzene (500 ml) are placed in a 2-liter three-necked round bottom flask fitted with a mechanical stirrer, reflux condenser, internal thermometer and dropping funnel. N-Decylamine, (157 grams; 1 mol) in pyridine (79 grams; 1 mol) is added dropwise with stirring over a 1-hour period of time. The reaction mixture is stirred for 16 hours at room temperature. The reaction mixture is then poured into water (6,000 cc) with vigorous stirring. The benzene layer is separated and dried over magnesium sulfate. The benzene layer is filtered to remove magnesium sulfate and the benzene removed under reduced pressure giving the desired N-n-decylamide of monomethyl tetrachloroterephthalate.

EXAMPLE 22

The acid chloride of monomethyl tetrachloroterephthalate (20.2 grams; 0.060 mols) and toluene (39.3 grams) are placed in a glass round bottom flask equipped with thermometer, stirrer, cooling means and condenser. A solution of potassium methyl mercaptide (5.3 grams; 0.062 mole) in methanol (10.4 grams; 0.32 mol) is added over a 2-hour reaction time with continuous stirring and with the temperature maintained between 20° and 30° C. A heating mantle is then substituted for the cooling means and the toluene and methanol are distilled off. Water (65 grams) is then added and the remainder of the toluene and methanol are removed by steam distillation. Water is added continuously to maintain a constant volume. The product is then filtered off, washed with water, and dried under vacuum. O,S-Dimethyl tetrachlorothioterephthalate is obtained.

The foregoing examples are illustrative of reactions which the acid chloride of monomethyl tetrachloroterephthalate will undergo.

In Example 21 N-decylamine was reacted to form the corresponding amide. Other amines can be substituted for it particularly the alkyl amines containing up to 14 carbon atoms. This reaction will yield the corresponding amide.

In Example 22 potassium methyl mercaptide was reacted with the acid chloride of monomethyl tetrachloroterephthalate. This specific mercaptide can be replaced with other alkyl mercaptides particularly those containing up to 14 carbon atoms.

I claim:

1. The process for the preparation of a monolower alkyl ester of tetrachloroterephthalic acid which comprises reacting a lower alkyl sulfuric ester selected from the group consisting of methyl sulfuric acid, ethyl sulfuric acid, dimethyl sulfate, diethyl sulfate, methyl chlorosulfonate and ethyl chlorosulfonate and tetrachloroterephthalic acid in a ratio between about 0.5:1 and 1.5:1 at a temperature above about 50° C in a substantially water-free system containing sulfur trioxide obtained by introducing methyl sulfuric acid, ethyl sulfuric acid, chlorosulfonic acid, methyl chlorosulfonic acid, dimethyl sulfate or sulfur trioxide into the reaction system in a molar amount greater that the sum of the moles of tetrachloroterephthalic acid plus one-half of the moles of methyl and ethyl sulfuric acid.

2. The process of claim 1 wherein the sulfur trioxide is obtained by introducing methyl sulfuric acid into the reaction system.

3. The process of claim 1 wherein the sulfur trioxide is obtained by introducing sulfur trioxide into the reaction system.

4. The process of claim 1 wherein the sulfur trioxide is obtained by introducing chlorosulfonic acid into the reaction system.

5. The process of claim 1 wherein the sulfur trioxide is obtained by introducing dimethyl sulfate into the reaction system at a temperature of at least 110° C.

6. The process of claim 1 wherein the lower alkyl sulfuric ester is methyl hydrogen sulfate.

7. The process of claim 1 wherein the lower alkyl sulfuric ester is methyl chlorosulfonate.

8. The process of claim 5 wherein the lower alkyl sulfuric ester is methyl chlorosulfonate.

9. The process of claim 1 wherein the lower alkyl sulfuric ester is ethyl hydrogen sulfate.

10. The process of claim 1 wherein the lower alkyl sulfuric ester is formed in situ by adding methyl bromide into the reaction system.

11. The process of claim 1 wherein the lower alkyl sulfuric ester is formed in situ by adding methanol into the reaction system.

12. The process of claim 1 wherein the lower alkyl sulfuric ester is formed in situ by adding methyl acetate into the reaction system.

13. The process of claim 1 wherein the lower alkyl sulfuric ester is formed in situ by adding ethyl bromide into the reaction system.

* * * * *